United States Patent [19]

Nomura et al.

[11] Patent Number: 4,686,341
[45] Date of Patent: Aug. 11, 1987

[54] GAS SHIELD CHAMBER FOR ARC WELDING OF RAILS

[75] Inventors: Hirokazu Nomura; Yukihiko Sato; Yasuhiko Nishi, all of Mie; Mizuho Higurashi, Tokyo; Saburo Mori, Yokohama, all of Japan

[73] Assignees: Nippon Kokan Kabushiki Kaisha, Tokyo; Nippon Kokan Koji Kabushiki Kaisha, Yokohama, both of Japan

[21] Appl. No.: 848,495

[22] Filed: Apr. 7, 1986

[30] Foreign Application Priority Data

Apr. 26, 1985 [JP] Japan .................................. 60-88712

[51] Int. Cl.[4] .............................................. B23K 9/16
[52] U.S. Cl. ........................................ 219/54; 219/53; 219/74; 219/73.1
[58] Field of Search .................... 219/53, 54, 74, 73.1, 219/72, 136

[56] References Cited

U.S. PATENT DOCUMENTS

| 3,291,955 | 12/1966 | Shrubsall et al. | 219/73.1 X |
| 3,296,412 | 1/1967 | Waite et al. | 219/73.1 X |
| 4,429,207 | 1/1984 | Devletian et al. | 219/73.1 |

FOREIGN PATENT DOCUMENTS 153581  9/1984  Japan ..................................... 219/74

Primary Examiner—E. A. Goldberg
Assistant Examiner—C. M. Sigda
Attorney, Agent, or Firm—Fleit, Jacobson, Cohn & Price

[57] ABSTRACT

A gas shield chamber for enclosing a welding joint of a pair of rails during the arc welding of the welding joint. A pair of side backing plates are each held in contact with the groove at one side of the rails within the chamber and the side backing plates are respectively movable independently of each other by a pair of drives having manual-powered operation change-over means. The ratio of respective flow rates of each shielding gas from respective injectors into the chamber is varied in accordance with the movement of the side backing plates. A pair of ground terminals of a welding power source are arranged on the sides of the rails.

5 Claims, 5 Drawing Figures

GAS SHIELD CHAMBER FOR ARC WELDING OF RAILS

BACKGROUND OF THE INVENTION

1. Field of the Invention

The present invention relates to improvements in a gas shield chamber used in the welding of rails by gas shielded arc welding.

2. Description of the Prior Art

When welding rails by gas shielded arc welding, it has been usual in the past so that after the butt welding area of the rails have been surrounded on all sides by a gas shield chamber thus shielding the welding area from the atmosphere, a shielding gas is injected around the welding area inside the chamber and the arc welding is effected in this gas atmosphere by a welding nozzle.

In one of the prior art gas shield chambers used for this purpose, the gas shield chamber comprises a chamber casing having one side opened and the other five sides enclosing the front, back, top and lateral sides of the welding joint of rails and a back cover placed in contact with the bottom surfaces of the rails at the welding joint through a backing plate and adapted to close the open side of the casing. Also, disposed inside the casing are a pair of side backing plates or blocks which are movable toward and away from the welding joint of the rails for contact with the sides thereof so as to prevent the weld metal from leaking and dropping from the welding joint during the welding of the webs and heads of the rails at the welding joint. Each of the side backing plates is mainly made of copper and formed therein with a cooling water flow path so as to be cooled with water supplied from the outside. Also, each of the side backing plates is provided with a plurality of shielding gas jets so that the side backing plates inject the shielding gas, along with a separate shielding gas injector arranged in the uppart of the chamber, into the chamber during the welding and the arc welding is performed in this gas atmosphere by a welding nozzle.

However, this prior art gas shield chamber involves a number of problems which will be described hereunder. The problems include the following.

(a) Since the screw shafts for moving the side backing plates are positioned above the welding area within the chamber, during the welding the spatter and fume tend to deposit on the shafts and this impedes the movement of the side backing plates.

(b) Due to the mechanism in which the screw shafts are arranged within the chamber and they cannot be touched from the outside, the screw shafts cannot be operated manually and moreover the side backing plates cannot be moved independently with each other.

(c) It is difficult to control the injection rate of the shielding gas so that during the welding the arc is disturbed if the injection rate is excessively large and the gas shield becomes insufficient if the injection rate is excessively small.

(d) Each of the side backing plates is formed with an excess weld metal or bead depositing groove at its portion adapted to contact with the welding groove and therefore there is the danger of causing an incomplete penetration at the boundary area between the webs and heads of the rails depending on the shape of the excess bead depositing grooves.

(e) While the ground line is connected from the welding power source to the chamber back cover, the ground point is provided on the one side only, and thus there is the danger of deflecting the welding arc to the opposite side to the ground point due to the effect of the deflected magnetic blow and thereby causing a defect such as an overlap etc. on the ground point-side portion of the surface of the boundary area between the webs and flanges of the rails.

(f) It is necessary to attach by welding, tape or the like a weld metal leakage preventing tab to each side of the rail flanges at the welding area and this operation requires a considerable time.

(g) The production of an excellent backing bead will be made difficult due to poor contact between the backing plate and the bottom surfaces of the rails.

(h) The hoses for the shielding gas and cooling water are connected at a number of points and the attachment of the hoses requires a considerable time.

SUMMARY OF THE INVENTION

It is the primary object of the present invention to provide an improved gas shield chamber which overcomes the foregoing deficiencies of the prior art gas shield chamber and which is capable of stabilizing the quality of a weld zone and simplifying the welding operation.

To accomplish the above object, in accordance with the invention there is thus provided a gas shield chamber for use in the welding of rails, which is constructed in the following manner.

(A) Hoses to be connected to inlet and outlet ports for a shielding gas and cooling water for side backing plates are gathered at one place and also the flow rate of the shielding gas is controllable in accordance with the movement of the side backing plates.

(B) Side backing plate driving means is arranged outside the chamber for each of the left and right side backing plates. The drive means include change-over means for manual operation and the drive means are operable independently of each other.

(C) A chamber back cover held in contact with the bottom surfaces of rails at their welding area is provided with tabs which are movable back and forth.

(D) A backing plate is screwed to the chamber back cover.

(E) A pair of welding ground terminals are provided at the left and right sides of the chamber back cover contacting with the rails.

(F) The groove formed in the welding groove contacting portion of each side backing plate has a depth about two times the conventional one at the boundary surface between the webs and heads of the rails.

In accordance with the invention, the arrangement of the above (A) decreases the number of the shielding gas and cooling water connections to 3 and the connecting operation is made easier than previously.

Also, in response to the contacting of the side backing plates with the rail welding area, the amount of the shielding gas injected from the side backing plate gas jets and the chamber top gas injector is controlled thereby decreasing the occurrence of defective welding due to any excessively large or small injection rate of the shielding gas.

Further, by virtue of the arrangement of the above (B), the side backing plate driving means is not subject to any trouble and the pair of right and left side backing plates are movable independently of each other. Also, the driving means are operable by manual operation. In addition, the deposition of any spatter and fume on the driving shafts is prevented with the resulting elimination of any impediment to the movement of the side backing plates due to such deposition.

Further, the arrangement of the above (C) has the effect of greatly simplifying the tab mounting operation and preventing any leakage of the weld metal during the welding.

Further, the arrangements of the above (D), (E) and (F) have the effect of preventing the occurrence of defects such as an overlap etc., incomplete penetration, etc., and ensuring the production of excellent penetration beads and symmetrical excess metal shapes.

The above and other objects as well as advantageous features of the invention will become more clear from the following description taken in conjuction with the drawings.

DESCRIPTION OF THE PREFERRED EMBODIMENTS

Figure 1:
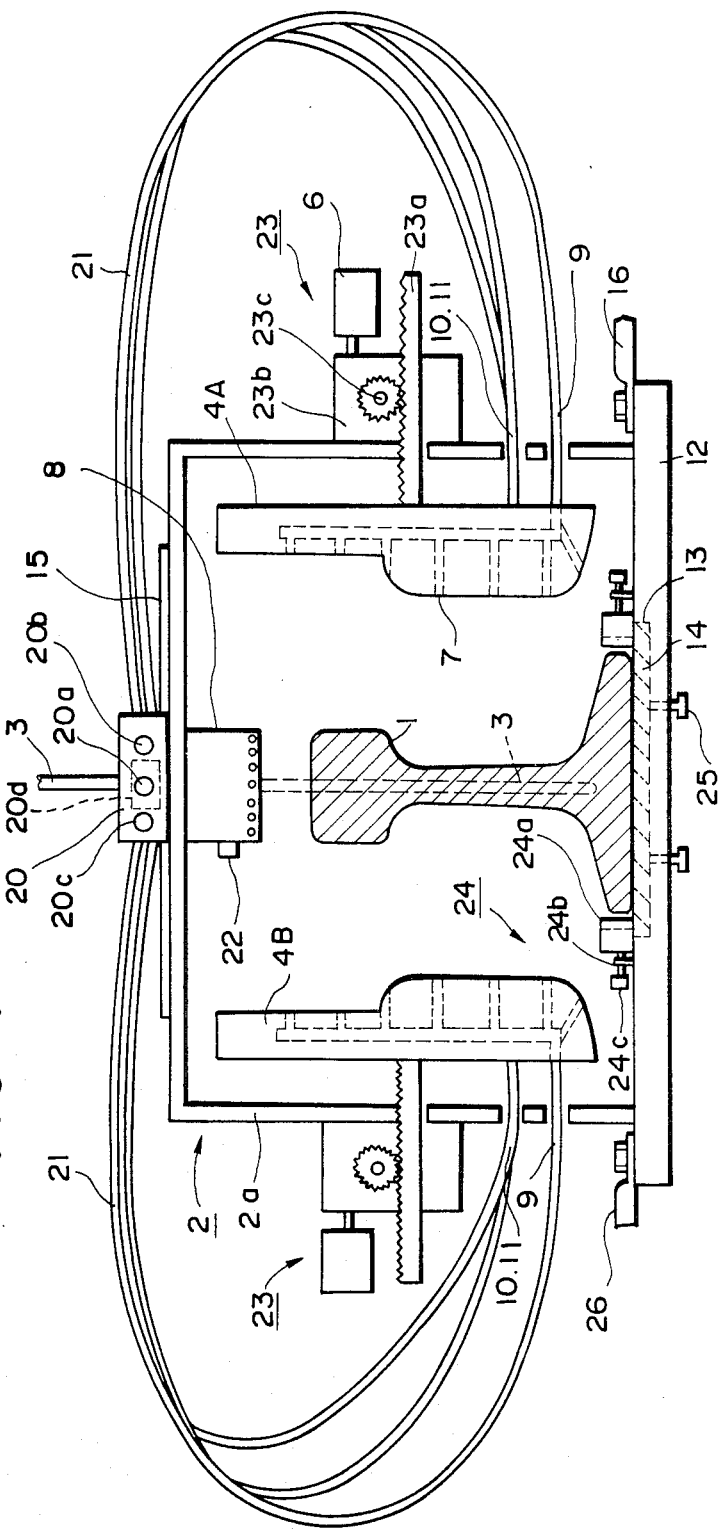
FIG. 1 is a sectional view of a gas shield chamber showing an embodiment of the invention.
Figure 2:
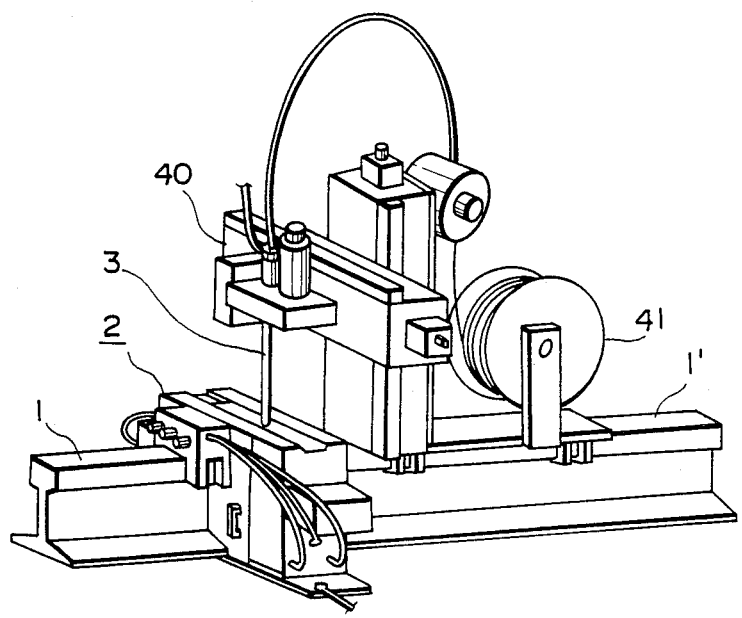
FIG. 2 is a perspective view of a gas shielded arc welding apparatus.

Referring to FIGS. 1 and 2 showing an embodiment of the invention, numerals 1 and 1' designate rails to be joined by welding, 2 a gas shield chamber according to the invention, 2a a chamber casing, 3 a welding nozzle, 4A and 4B side backing plates, 6 side backing plate driving motors, 7 side backing plate shielding gas jets, 8 a top shielding gas injector, 9 shielding gas inlets, 10 cooling water inlets, 11 cooling water outlets, 12 a chamber back cover, 13 a recess, 14 a backing plate, 15 a top cover, 20 an integrated block for the shielding gas and side backing plate cooling water, 20a a gas inlet, 20b a water inlet, 20c a water outlet, 21 hoses, 22 a switch, 23 side backing plate drives including manual-powered operation change-over means, 23a side backing plate driving shafts, 23b gear boxes, 23c manual-powered operation change-over push buttons, 24 movable tabs, 24a tab plates, 24b holding plates, 24c holding screws, 25 locking screws, and 16 and 26 ground terminals. In FIG. 2, numeral 40 designates an arc welding head and 41 a welding wire reel.

As shown in the Figures, the shielding gas inlets 9 and the cooling water inlets and outlets 10 and 11 are connected to the integrated block 23 by the hoses 21 and the top gas injector 8 is also connected to the integrated block 20. The integrated block 20 includes the gas inlet 20a, the cooling water inlet and outlet 20b and 20c and a control valve 20d for connection to a gas source and a water source. As a result, the number of the gas and water connection ports is reduced to 3 and the connecting operation is simplified.

The switch 22 is mounted on one side of the top gas injector 8 so as to be operated by the approaching side backing plate 4B to operate the valve 20d to control the flow ratio of the shielding gas supply between the gas injector 8 and the shielding gas jets 7 of the side backing plates 4A and 4B. Thus, the control valve 20d is operated in such a manner that when the side backing plates 4A and 4B are pressed against the welding area of the rails, the ratio of a gas injection quantity of said gas injector 8 to a gas injection quantity of said gas jets 7 is changed from 50:50 to 80:20. As a result, the occurrence of any irregularity in the welding arc due to the gas injected from the shielding gas jets 7 of the side backing plates 4A and 4B is eliminated and the occurrence of any weld defect at the rail heads due to insufficient gas injection is prevented.

The drives 23 for the pair of side backing plates 4A and 4B are separately arranged on the outer side of the chamber casing 2a so that during the welding the deposition of any spatter and fume on the driving shafts 23a is prevented and the movement of the side backing plates 4A and 4B is not impeded. The drives 23 include the gear boxes 23b for increasing the reduction ratio and they also incorporate the change-over means composed of the push buttons 23c so that the side backing plates 4A and 4B can be moved separately independent of each other and also they can be moved manually by pushing the push buttons 23c.

Also, the movable tabs 24 each including the tab plate 24a, the holding plate 24b and the holding screw 24c are mounted on the surface of the chamber back cover 12 so as to be fastened to the rails 1 and 1' during the welding and thus there is the effect of eliminating the time and labor required for welding tabs for every welding operation.

Figure 3:
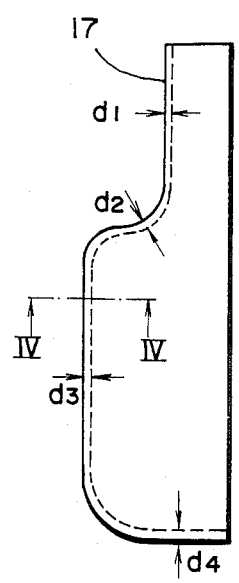
FIG. 3 is a side view of the side backing plate.
Figure 4:
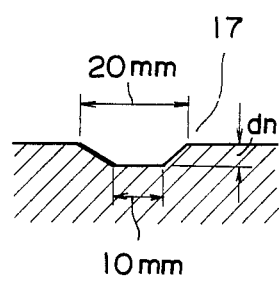
FIG. 4 is a partial enlarged sectional view looked in the direction of the arrowed line IV—IV of FIG. 3.
Figure 5:
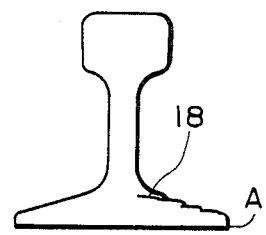
FIG. 5 is a diagram useful for explaining an overlap defect.

Also, the backing plate 14 is closely fitted to the lower surfaces of the rails with the holding screws 25 and this ensures the production of excellent penetration beads. In addition, the welding ground terminal 26 is additionally provided on the opposite slde to the existing terminal 16 and this has the effect of preventing the occurrence of a marked overlap 18 as shown in FIG. 5. Also, the side backing plates 4A and 4B are each formed in its welding groove engaging portion with a groove 17 having a depth $d_n$ (FIG. 4) which is increased to 3.0 mm or about two times the conventional depth of 1.5 mm at a boundary portion $d_2$ between the webs and heads of the rails and this has the effect of preventing the occurrence of any incomplete penetration which tends to occur in such portion. In the case of FIG. 3, the depths $d_1$, $d_3$ and $d_4$ are respectively 1.5 mm, 1.5 mm and 3.0 mm.

The chamber top cover 15 is made of an insulating material and it is adapted to be moved laterally in response to the movement of the welding nozzle 3.

We claim:

1. A gas shield chamber for arc welding of rails comprising:

a chamber casing having an electrically conductive openable back cover placed in contact with bottom surfaces of a pair of rails at a welding joint thereof through a backing material, said chamber casing enclosing said rails at said welding joint when said back cover is closed;

gas injecting means for injecting a shielding gas into said chamber casing;

a pair of side backing plates independently movable toward and away from each other and each having an excess metal depositing groove adapted for contact with a welding groove on one side of said rail welding joint within said chamber casing;

a pair of drive means including manual-powered operation change-over means and respectively arranged on both sides of said chamber casing on an outer side thereof so as to move said pair of side backing plates independently of each other;

means for fastening said backing material to said back cover;

a pair of ground terminals respectively arranged on both sides of a portion of said back cover contacting with said rail bottom surfaces; and an integrated block integrally including shielding gas inlet and outlet ports for said shielding gas injecting means and cooling water inlet and outlet ports for said side backing plates, said integrated block including control means for controlling the gas injection amount of said shielding gas injecting means in response to the movement of said side backing plates, said integrated block being fixedly mounted on said chamber casing.

2. A gas shield chamber according to claim 1, wherein each said excess metal depositing groove is increased in depth by about two times in a portion thereof corresponding to a boundary portion between webs and heads of said rails over a conventional groove.

3. A gas shield chamber according to claim 1, wherein said gas injecting means includes a gas injector positioned above said rails within said chamber, and a plurality of gas jets provided in said side backing plates.

4. A gas shield chamber according to claim 3, wherein said control means changes the ratio of a gas injection quantity of said gas injector to a gas injection quantity of said gas jets when said side backing plates are contacted with said rails.

5. A gas shield chamber according to claim 1, wherein said back cover includes a pair of movable tabs oppositely arranged on both sides of flanges of said rails.

* * * * *